US006447895B1

(12) United States Patent
Kamir et al.

(10) Patent No.: US 6,447,895 B1
(45) Date of Patent: Sep. 10, 2002

(54) THERMAL STENCIL SHEET FOR USE WITH A PRINTING SYSTEM

(75) Inventors: Yosef Kamir, Netanya; Murray Figov, Ra'anana; Narda Ben-Horin, Tel Aviv; Lior Lifshitz, Maoz Zion; Moshe Frenkel, Jerusalem, all of (IL)

(73) Assignee: Aprion Digital Ltd., Netanya (IL)

(*) Notice: Subject to any disclaimer, the term of this patent is extended or adjusted under 35 U.S.C. 154(b) by 0 days.

(21) Appl. No.: 09/402,205

(22) PCT Filed: Jan. 19, 1998

(86) PCT No.: PCT/IL98/00024

§ 371 (c)(1), (2), (4) Date: Dec. 28, 1999

(87) PCT Pub. No.: WO98/43823

PCT Pub. Date: Oct. 8, 1998

(30) Foreign Application Priority Data

Mar. 31, 1997 (IL) ................................................ 120565

(51) Int. Cl.[7] ......................... B32B 23/00; B32B 27/36; B32B 27/40; B41N 1/24; B41F 13/00

(52) U.S. Cl. ............................. 428/311.11; 428/311.31; 428/423.1; 428/480; 428/532; 442/394; 442/395; 101/114; 101/116; 101/121; 101/127; 101/128.21; 101/129

(58) Field of Search ........................... 428/423.1, 304.4, 428/311.11, 311.31, 311.51, 311.71, 311.91, 532; 101/114, 116, 127, 121, 128.21, 129; 442/394, 395

(56) References Cited

U.S. PATENT DOCUMENTS

| | | | | |
|---|---|---|---|---|
| 5,198,407 A | | 3/1993 | Motegi et al. | |
| 5,415,090 A | | 5/1995 | Natori et al. | |
| 5,458,915 A | | 10/1995 | Yamamoto | |
| 5,483,883 A | * | 1/1996 | Hayama et al. | 101/128.4 |
| 5,491,503 A | | 2/1996 | Fuwa et al. | |
| 5,713,278 A | | 2/1998 | Kawano et al. | |
| 5,992,314 A | * | 11/1999 | Lorenz et al. | 101/128.21 |

FOREIGN PATENT DOCUMENTS

| | | | |
|---|---|---|---|
| EP | 0 593 050 A2 | * | 4/1994 |
| GB | 1357988 A | * | 6/1974 |
| JP | 01-253482 A | * | 10/1989 |

* cited by examiner

*Primary Examiner*—Vivian Chen

(74) *Attorney, Agent, or Firm*—Eitan, Pearl, Latzer & Cohen-Zedek

(57) ABSTRACT

A thermal stencil sheet for use in a laser stencil printing system comprising a stencil sheet comprising a base layer, a radiation absorbing layer, and a thermal film overlying the radiation absorbing layer. The base layer comprises a porous fibrous material which is saturatable with liquid.

21 Claims, 7 Drawing Sheets

THERMAL STENCIL SHEET FOR USE WITH A PRINTING SYSTEM

FIELD OF THE INVENTION

The present invention relates to the field of stencil printing in general and more particularly to the duplicator stencil process.

BACKGROUND OF THE INVENTION

The duplicator stencil used in this process is an ink impervious layer in which holes are made through which ink can be fed onto paper. Whilst this process has been used for many decades, the means of making these holes in the stencil have changed considerably. The earliest method was to use a writing stylus and with the invention of type-writers, the impact of the type was used to make the hole. Subsequently, the impervious layer was electrically eroded with a spark and alternatively pierced by reflex infra-red radiation. For the latter two methods, the information was supplied in the form of written matter on paper.

With the advent of the computer, material was then available in a digital form, and stencil duplicators were developed into stencil printers. This was done utilizing the thermal stencil design previously developed for reflex infra-red radiation sensitive material. Such stencils consist of a "Yoshino" type tissue with a thin pre-stretched film which may be polyvinylidene chloride, such as the commercially available 'Saran" type, manufactured by Dow Plastics of Midland, USA, bonded to the surface of the tissue. The stencil is imaged by a thermal contact head where each thermal point is digitally controlled to heat up to correspond to an image point. A suitable stencil printer is described in U.S. Pat. No. 4,628,813 to Hageyama. The heated pre-stretched film retracts, leaving a hole through which ink can pass. This process differs in quality from the previous reflex method although the stencil material is still the same. The previous method was restricted in quality because it relied on the difference in heat between background and image on a piece of printed paper that was held in contact with the film during exposure. The printed area needed to be heat absorptive and only carbon black based inks worked well.

An alternative method of imaging the stencils is by using an infra red laser. Infra red laser methods differ from the previous method in that the head does not comes into contact with the stencil. Thus, there is no wear from contact and the head cannot be contaminated by film as may happen with conventional thermal heads. It is easier to place small image spots closer together to obtain high resolution imaging.

Reference is made to FIG. 1, which illustrates the component layers of a prior art thermal stencil sheet, generally designated 10, which may be perforated using laser beams.

Stencil sheet 10 generally comprises several layers including a base layer 12, an adhesive layer 14, a thermal film 16 and a top coated surface 18. Base layer 12 is generally a porous fibrous layer such as non-woven paper tissue, for support of the perforated film. Adhesive layer 14 adheres the thermal film 16 to the base 12. Thermal film 16 comprises a suitable polyester film material, such as polyethylene terephthalate or polyvinylidene chloride. The coated surface 18 is generally used to protect the thermal film 16 from fusing and being damaged due to friction and may comprise a silicon fluorine mold lubricant, for example.

When a laser beam is irradiated to a thermal stencil sheet made of a heat-sensitive plastic film having a relatively high transparency, most of the laser beam merely passes through the heat-sensitive plastic film. There are several methods for applying the laser energy to the film, all of which involve the conversion of the light energy to heat. Therefore, in order to apply a heating effect to such a thermal stencil sheet by a laser beam sufficient to cause a perforation thereof, a laser beam is required to have an extremely high energy density. The cutting of the film is influenced by the structure of the base material. Being a non-uniform substance, it has a different effect on different areas of the film, as much as heat diffusion, mechanical stress and adhesion are concerned. As a result, the film areas being cut due to the laser heating have poor definition. Small details can not be reproduced at all.

The non uniform structure of the base is required for the ink transfer in the printing stage. It is therefore an essential attribute of the base material and can not be modified.

FIG. 2 illustrates in a magnified cross section the condition of perforation formed in the thermal film 16 by a conventional minute thermal element (indicated by arrows 17) pressed against the heat-sensitive film from its front side. A part of the film fused by the thermal head sticks to the head resulting in a cone shape (19) having diameter increasing toward the front side.

GB Patent No. 1,357,988 assigned to Riso Kagaku Corporation of Japan, describes the use a black stencil sheet having fine particles of a light absorbing heat generating substance, such as carbon, distributed in a heat-sensitive plastic film. In order to produce a fine stencil print by using such a stencil sheet, the light absorbing heat generating substance needs to be distributed at high density and uniformity in the heat-sensitive plastic film. Since it is not possible to strongly bind the particles to the film by chemical means, the fine solid particles are held in the plastic layer by mechanical means, which is not effective. Thus, the stencil sheet is not suitable for use with a laser beam having low energy density.

U.S. Pat. No. 5,483,883 to Hayama describes a method for imaging a stencil using a relatively low energy laser and light absorbing ink. Reference is now made to FIG. 3 which illustrates a stencil sheet 50 mounted onto a printing drum and held thereto by a layer of black ink. The stencil sheet 50 has a heat sensitive plastic film 52 and a net material 54 laid one over the other and bound together. When a laser beam 51 is irradiated to the heat-sensitive plastic film 52 of the stencil sheet backed by the black ink layer 56 attached to the rear surface thereof, most of the laser beam passes through the heat-sensitive plastic film 52 so as to reach the black ink layer 56 where it is absorbed. The temperature of the ink at the irradiated portion rapidly increases, causing heat-sensitive plastic film to melt thereby forming a hole, starting from the rear surface thereof.

FIG. 4 illustrates the type of perforation formed in a heat-sensitive plastic film such 52 by a laser beam irradiated from its front side. The perforation formed by the heat-sensitive plastic film is melted by the heat generated in the ink layer 56 existing on the rear side of the plastic film. In this case, the bore of the perforation has a cone shape having a diameter increasing (from $d_1$ to $d_2$) towards the rear side.

Unfortunately, since specifically infra red absorbing materials are not available, the stencil requires high infra red radiation to image.

SUMMARY OF THE INVENTION

The applicants have discovered that by applying a very thin resin based film containing infra red absorbing material, excellent accurate imaging can be achieved using low cost lasers, such as laser diodes.

An object of the present invention is to provide an improved stencil sheet for use with a thermal head which overcomes the limitations and disadvantages of prior art stencil sheets.

There is thus provided, in accordance with an embodiment of the invention, a thermal stencil sheet which includes a thermal film attached by means of an adhesive to a base layer and a coated surface applied to the thermal film. The coated surface contains a resin based film having infra red (IR) absorbing material dispersed therein.

Furthermore, in accordance with an embodiment of the invention, on irradiation of the stencil sheet with infra red laser rays, a perforation having a bore of uniform cross-section is formed extending through the film.

Additionally, there is provided, in accordance with an embodiment of the invention, a method of preparing a thermal stencil sheet. The method includes the steps of:

a. attaching a thermal film to a base layer; and b. applying a coated surface to the thermal film, the coated surface containing a resin based film having infra red (IR) absorbing material dispersed therein.

Additionally, in accordance with an embodiment of the invention, the IR absorbing material includes any of the following group: carbon blacks, iron oxide and infra red absorbing dyes.

Furthermore, in accordance with an embodiment of the invention, the resin based film includes any of the following group: polyurethane, nitro cellulose and cellulose acetate butyrate.

Additionally, there is provided, in accordance with an embodiment of the invention, a stencil printing system utilizing the thermal stencil sheet of the invention. The system includes laser source means for supplying an infra red (IR) laser beam, control means for controlling the laser source means and a stencil sheet. On exposure to the IR laser beam, the stencil sheet is perforated according to instructions sent by the control means to obtain a desired pattern.

Additionally, there is also provided, in accordance with an embodiment of the invention, a thermal stencil sheet which includes a base layer, a radiation absorbing layer containing a resin based film having infra red (IR) absorbing material dispersed therein and a thermal film overlying the radiation absorbing layer.

Furthermore, in accordance with an embodiment of the invention, the radiation absorbing layer is attached by means of an adhesive to the base layer.

Furthermore, in accordance with an embodiment of the invention, the radiation absorbing layer further includes an adhesive mixed therein for adhering the radiation absorbing layer to the base layer.

Additionally, in accordance with an embodiment of the invention, the thermal stencil sheet further includes a top-most layer overlying the radiation absorbing layer and an intermediate layer underlying the radiation absorbing layer, wherein the intermediate layer is attached by means of an adhesive to a the base layer. The radiation absorbing layer is attached by means of an adhesive to the intermediate layer.

Alternatively, the radiation absorbing layer further includes an adhesive mixed therein for adhering the radiation absorbing layer to the intermediate layer. The adhesive is a ketone solvable glue.

Furthermore, in accordance with an embodiment of the invention, the stencil base includes porous fibrous material which is saturatable with liquid. The liquid includes any of a group including water, petroleum solvent, Toluene and printing ink.

Finally, there is provided a stencil printing system utilizing the thermal stencil sheet of the invention. The stencil printing system includes laser source means for supplying an infra red (IR) laser beam, control means for controlling the laser source means; and a stencil sheet described.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 5:
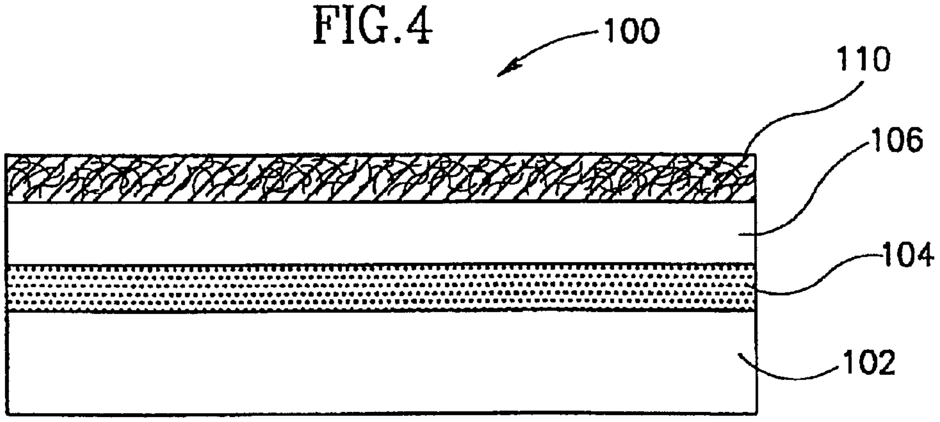
FIG. 5 is a sectional illustration of the component layers of a master stencil sheet, constructed and operative in accordance with a preferred embodiment of the present invention.

Reference is now made to FIG. 5, which illustrates the component layers of a thermal master stencil sheet, generally designated 100 constructed and operative in accordance with a preferred embodiment of the present invention.

Figure 1:
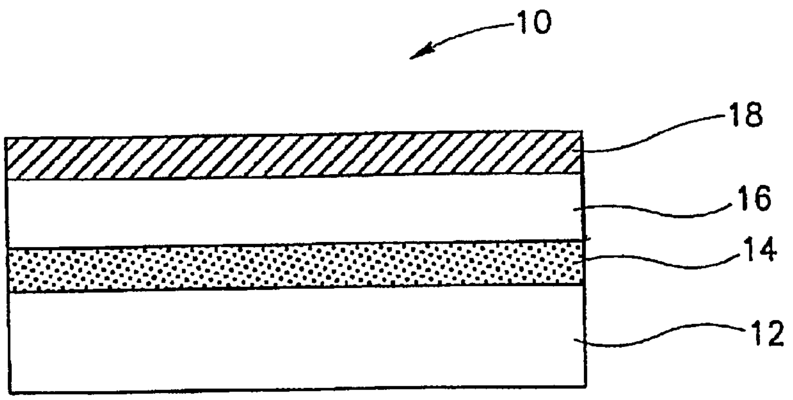
(PRIOR ART) FIG1
FIG. 1 is a sectional illustration of the component layers of a prior art thermal master stencil sheet.
Figure 2:
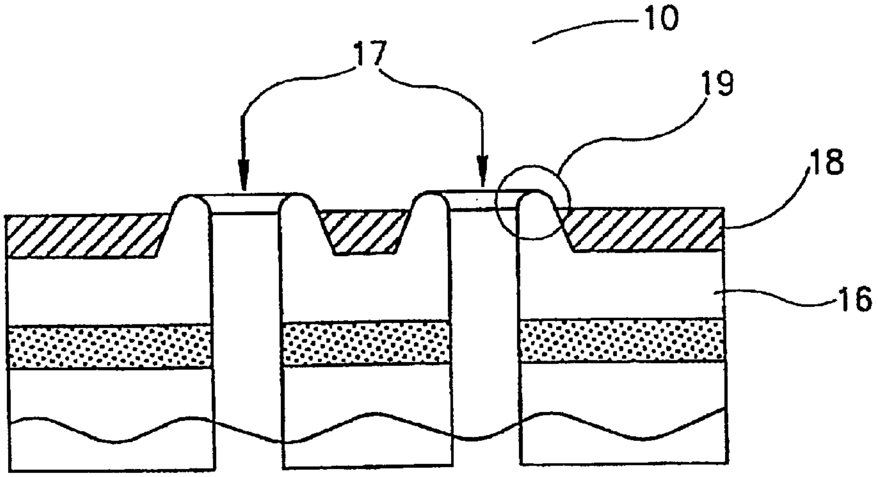
(PRIOR ART) FIG2
FIG. 2 is a cross sectional illustration of the perforation formed in the thermal film of FIG. 1.
Figure 3:
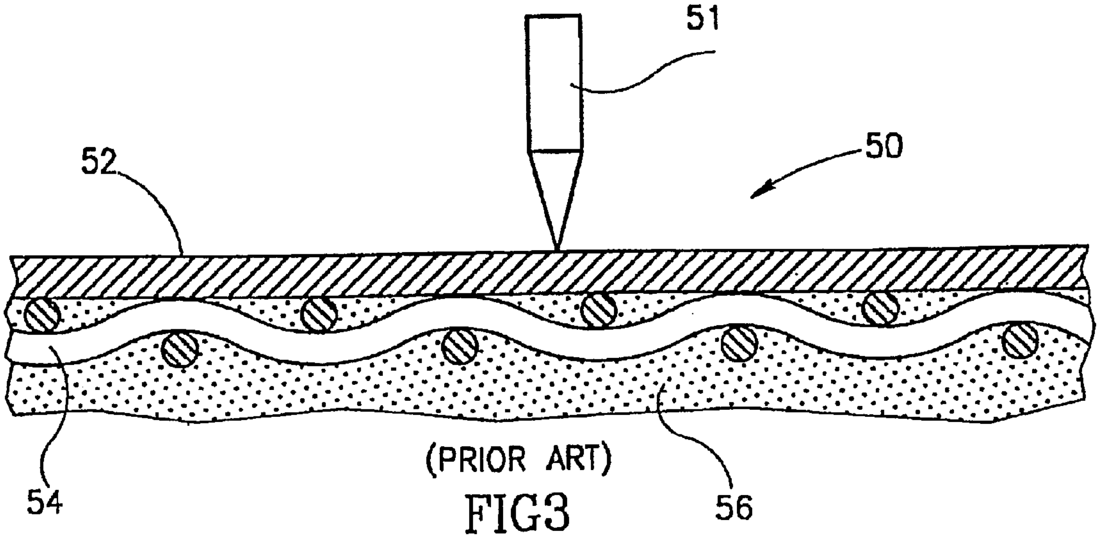
(PRIOR ART) FIG3
FIG. 3 is a sectional view of a stencil sheet mounted onto a printing drum according to a prior art embodiment.
Figure 4:
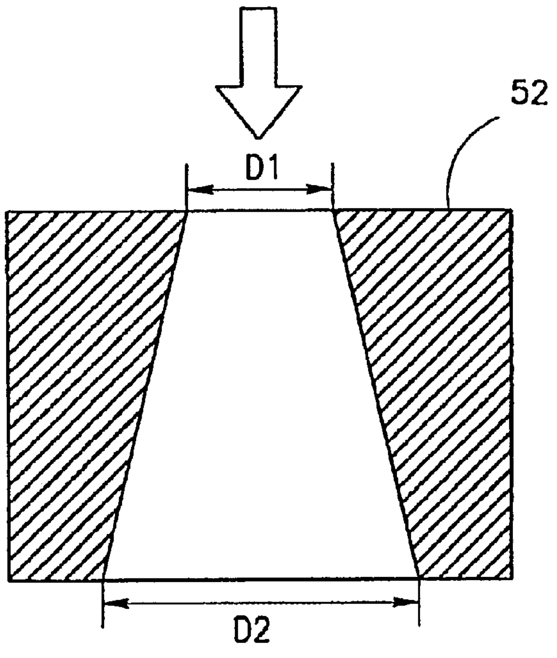
(PRIOR ART) FIG.4
FIG. 4 is a cross sectional illustration of the perforation formed in the thermal film of FIG. 3.

Stencil sheet 100 comprises a base layer 102, an adhesive layer 104 and a thermal film 106 which are substantially similar to base layer 12, adhesive layer 14 and thermal film 16 described hereinabove with respect to the prior art sheet illustrated in FIG. 1.

Stencil sheet 100 further comprises an absorbing surface 110 which is coated on top of thermal film 106. When a laser beam is irradiated to the stencil sheet 100 the laser is partly absorbed by absorbing surface 110 and partly passes through the thermal film 106. The other layers are transparent to the IR.

By using a very thin resin based film containing infra red absorbing material, excellent accurate imaging can be achieved using low cost lasers such as laser diodes without the need for high infra red radiation.

An exemplary stencil sheet 100 has a total dry weight (excluding the tissue base) of not greater than 5 grams per square meter and preferably has a total weight less than 1 gram per square meter. The sheet 100 may consist of any suitable binder resin which has an infra-red absorbing material dissolved or dispersed therein. Examples of suitable resins are polyurethanes, nitro cellulose and cellulose acetate butyrate. Examples of suitable infra red absorbers are carbon blacks, iron oxide and infra red absorbing dyes such as IR140 and IR27 sold by Aldrich Chemical Co, Milwaukee, Wis.

Figure 6:
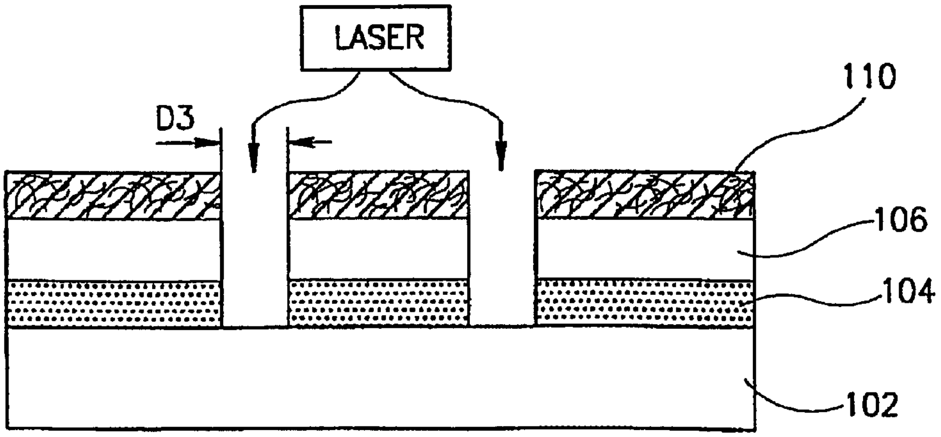
FIG. 6 is a cross sectional illustration of the perforation formed in the thermal film of FIG. 5.

A cross-section of the perforation formed in the stencil sheet 100 is illustrated in FIG. 6. The type of perforation formed in the sheet 100 occurs due to the absorption of the IR laser ray by the absorbing layer 110 where it heats the thermal film 106 at the point of absorption. As a result, the layers 110 and 106 are ablated, causing a tiny perforation extending through the film 106. Some melting of the film 106 may also occur in combination with the ablation to create the substantial uniform perforation bore shown in FIG. 6.

Absorbing surface 110 preferably comprises a carrier resin in which an infra red absorbing dye or pigment is dispersed or dissolved.

Following are a number of non-limiting examples illustrating possible formulations of suitable resins. The following formulations were made up (all quantities are in parts by weight).

EXAMPLE I

| | |
|---|---|
| Neorez 9679 (aqueous dispersion of polyurethane Zeneca Chemicals Corporation, Wilmington, Massachusetts USA) | 25.30 |
| Direct Black 19INA dye solution (Zeneca Corp.) | 70.20 |
| Cymel 373 (methoxymethyl methylol melemine by Dyno-Cytec KC, Littlestrom, Norway) | 20.20 |
| Triton X-100 (iso-Octylphenoxypolythanol sold by BDH, Poole, Dorset, England) | 0.25 |
| 2-Butoxy Ethanol | 4.00 |
| Tint-Ayd Black 7313 (Daniel Products Company, Jersey City, New Jersey, USA) | 47.00 |
| Neocryl CX-100 cross-linker (Zeneca) | 3.30 |

The mixture was stirred thoroughly and then bar coated on the film side of a thermal stencil as supplied by the Daito Chemical Co. of Gifu, Japan, after pre-washing the film surface with alcohol. The coating was air dried for five minutes at 100 degrees centigrade to a dry weight of 1 gram per square meter.

EXAMPLE II

| | |
|---|---|
| Neorez 9679 (aqueous dispersion of polyurethane Zeneca Chemicals Corporation, Wilmington, Massachusetts USA) | 3.96 |
| Water | 52.50 |
| Butoxyethanol | 0.72 |
| Stan-Tone@90WD01 (aqueous dispersion of carbon black, Harwick, USA) | 22.34 |
| Neocryl CX-100 cross linker (Zeneca) | 0.39 |
| Ethanol | 30.15 |
| Q2-5211 (superwetting agent, Dow Corning Corp, Midland MI, USA) | 0.53 |

The mixture was stirred thoroughly and then bar coated on the film side of a thermal stencil as supplied by the Daito Chemical Co. of Gifu, Japan, after pre-washing the film surface with alcohol. The coating was air dried for five minutes at 100 degrees centigrade to a dry weight of 1 gram per square meter.

EXAMPLE III

| | |
|---|---|
| Neorez 9679 (aqueous dispersion of polyurethane Zeneca Chemicals Corporation, Wilmington, Massachusetts USA) | 1.03 |
| Water | 2.63 |
| Butoxyethanol | 0.18 |
| Stan-Tone@90WD01 (aqueous dispersion of carbon black, Harwick, USA) | 8.68 |
| Neocryl CX-100 cross linker (Zeneca) | 0.10 |
| Ethanol | 7.82 |
| Q2-5211 (superwetting agent, Dow-Corning Corp., Midland, MI, USA) | 0.24 |
| S16990012 (water soluble IR absorbing dye by Zeneca) | 0.63 |
| Cymel 373 | 4.00 |

The mixture was stirred thoroughly and then bar coated on the film side of a thermal stencil as supplied by the Daito Chemical Co. of Gifu, Japan, after pre-washing the film surface with alcohol. The coating was air dried for five minutes at 100 degrees centigrade to a dry weight of 1 gram per square meter.

EXAMPLE IV

| | |
|---|---|
| Water | 58.0 |
| i-propanol (IPA) | 20.0 |
| Ammonia | 2.0 |
| Microlith Black C-WA pigment (Ciba) | 20.0 |

In this example, the IR absorbing layer was based on a mixture containing Microlith C-WA Black pigment, manufactured by Ciba, which is formulated to be soluble in water. The Microlith C-WA Black pigment concentrate was prepared from the pigment and resin, according to the manufacturer's instructions and dissolved in water. The resulting liquid was applied as a single layer on the film side of a thermal stencil.

Optionally, the Microlith C-WA pigment concentrate can be further diluted in IPA. For a sample 0.75 $\mu$m layer, the C-WA pigment is diluted in IPA in the proportions of 1 part concentrate to 1 part IPA by weight. A 6 $\mu$m thick wet layer of the mixture is coated on the thermal film, which on drying is 0.75 $\mu$m thick.

Alternatively, for an IR absorbing layer having an adhesive, a mixture containing Microlith-K Black pigment, manufactured by Ciba, which is formulated to be soluble in ketones, is used.

In this case, the Microlith-K Black pigment concentrate is prepared from the pigment and resin, according to the manufacturer's instructions. The concentrate is then mixed with a ketone soluble glue in the proportions of 1 part concentrate to 2 parts glue. The resulting liquid was applied as a single layer on the film side of a thermal stencil for adhering to another layer.

Figure 7:
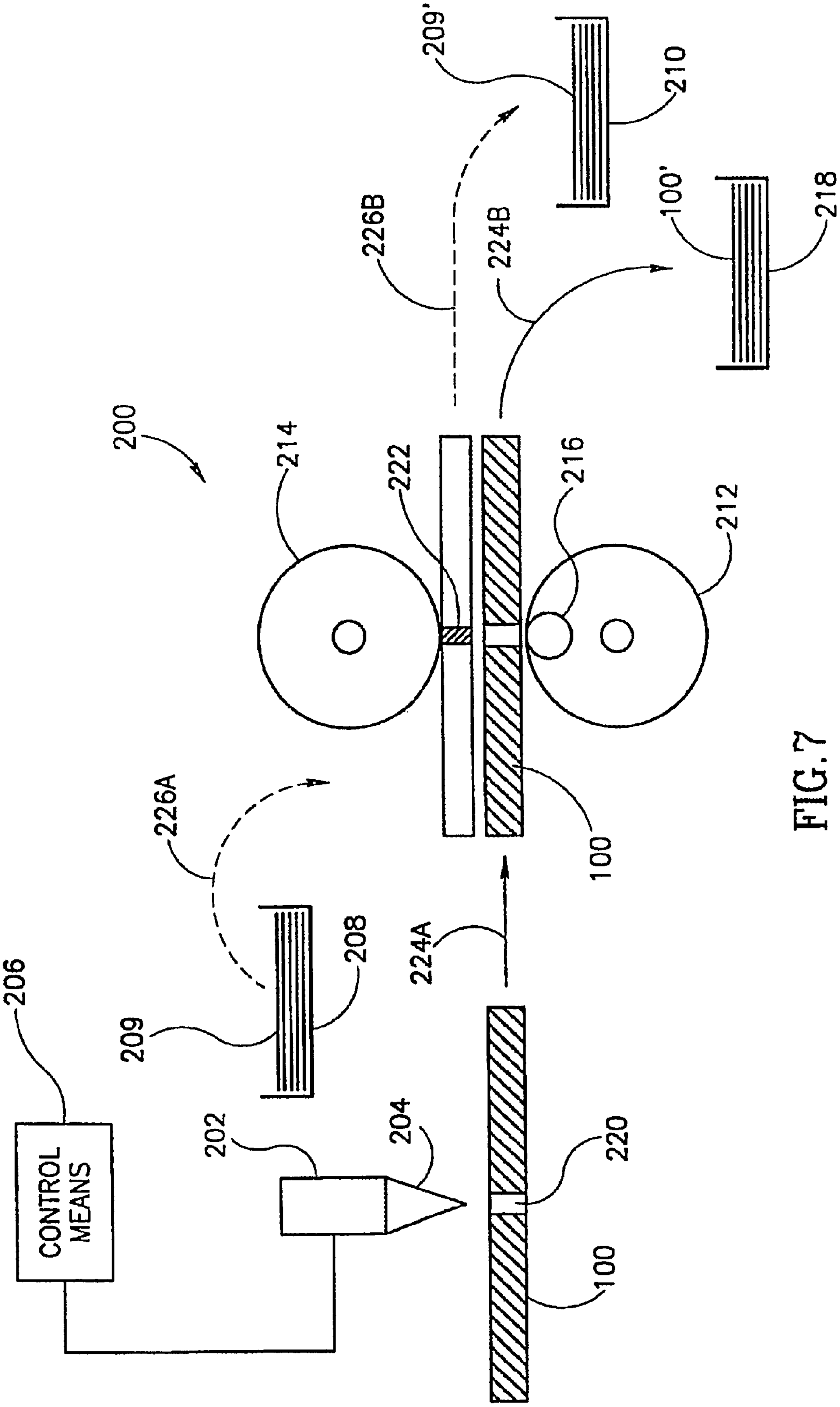
FIG. 7 is a schematic illustration of a stencil duplication system utilizing the stencil sheet of FIG. 5.

The use of stencil sheet 100 in a stencil duplication or printing system is schematically illustrated in FIG. 7.

Printing system, generally designated 200 comprises laser source means 202 supplying a laser beam 204, control means 206, an in-tray 208 containing printing sheets 209, an out-tray 210 for collecting the printed sheets 209' and a stencil tray 218 for collecting used stencil sheets 100' . Printing system 200 further comprises a rotary arrangement preferably containing a fixed drum 212 and a rotating drum 214. Fixed drum 212 contains an inking roller 216 which is in contact with the inner circumference of the drum 212 adjacent to grooves (not shown) which are formed on the circumference of the drum 212. All of the above components of the printing system 200 are known in the art components and will not be further described.

A strip of stencil sheet 100 is exposed to the IR laser beam 204 supplied by laser source 202. The stencil 100 is perforated according to the instructions sent by control means 206 to obtain the desired pattern. The stencil sheet 100 is then passed over fixed drum 212 containing inking roller 216. Synchronously, printing sheets 209 are supplied so as to be in contact with the perforated stencil sheet 100. Rotary drum 214 synchronously moves the stencil and printed sheets, 100 and 209 respectively. As the printing sheets 209 make contact with the perforated stencil 100, the ink from the inking roller 216 is attracted to the printing sheets 209 via the perforations 220 and the corresponding image 222 is recorded on to the printing sheet 209.

The used stencil 100' is deposited in stencil tray 218 and the printed sheet 209' is placed in out-tray 210. The path of the stencil 100 is shown by full arrows 224*a* and 224*b*, and the path of the printing sheet 209 is shown by dashed arrows 226*a* and 226*b*.

It will be appreciated that the present invention for a thermal stencil sheet is not limited to the stencil sheet described having a radiation absorbing surface coated on top of the thermal film layer.

Figure 8:
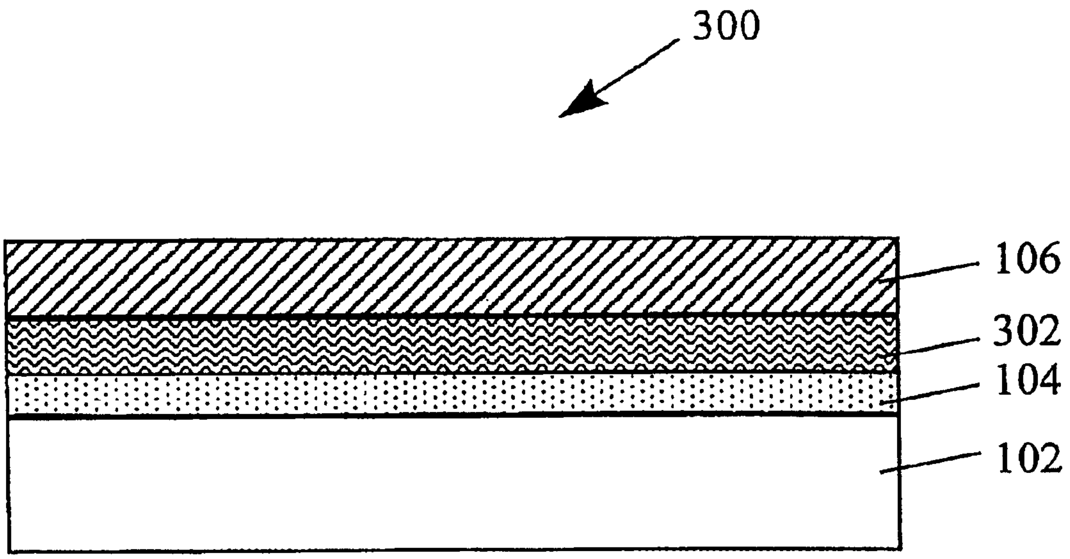
FIG. 8 is a sectional illustration of the component layers of a thermal stencil sheet, constructed and operative in accordance with a further preferred embodiment of the present invention.

Reference is now made to FIG. 8 which illustrates the component layers of a thermal master stencil sheet, generally designated 300 constructed and operative in accordance with another preferred embodiment of the present invention. Elements of this embodiment of the invention which are similar to elements which have been previously described with respect to the preferred embodiment hereinabove, are similarly designated and will not be further described.

Stencil sheet 300 comprises a base layer 102, an adhesive layer 104 and a thermal film 106. A radiation absorbing surface, referenced 302, is applied between the thermal film 106 and adhesive layer 104.

In this case, when a laser beam is irradiated to the stencil sheet 300 the laser passes through the thermal film 106 and is absorbed by absorbing surface 302. The absorption of the IR laser ray by the absorbing layer 302 heats the thermal film 106 at the point of absorption, thereby ablating layers 302 and 106 causing a tiny perforation to extend through the film 106.

A further preferred embodiment of the present invention is described with reference to FIG. 9 which illustrates the component layers of a thermal master stencil sheet, generally designated 350. In this embodiment, the stencil sheet 350 consists of three layers comprising a base layer 102, the thermal film layer 106 and an intermediate paste layer, referenced 352, which is directly applied to the base layer 102. Intermediate paste layer 352 comprises a mixture containing both an adhesive and radiation absorbing material.

Figure 9:
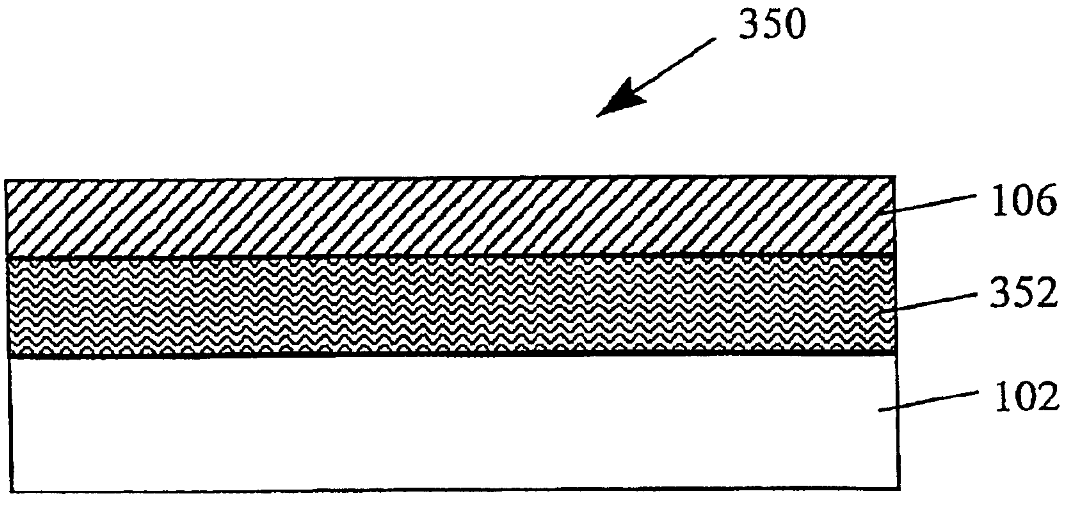
FIG. 9 is a sectional illustration of the component layers of a thermal stencil sheet, constructed and operative in accordance with a further preferred embodiment of the present invention.

Both the embodiments of FIGS. 8 and 9 ensure that the heat is efficiently diffused within the thermal layer 106. In the embodiment of FIG. 8, the absorbing layer 302 is in close contact with the adhesive layer 104. In the embodiment of FIG. 9, the intermediate paste layer 352 contains both an adhesive and radiation absorbing material. Thus, the adhesive reaches very high temperatures and is melted.

Figure 10:
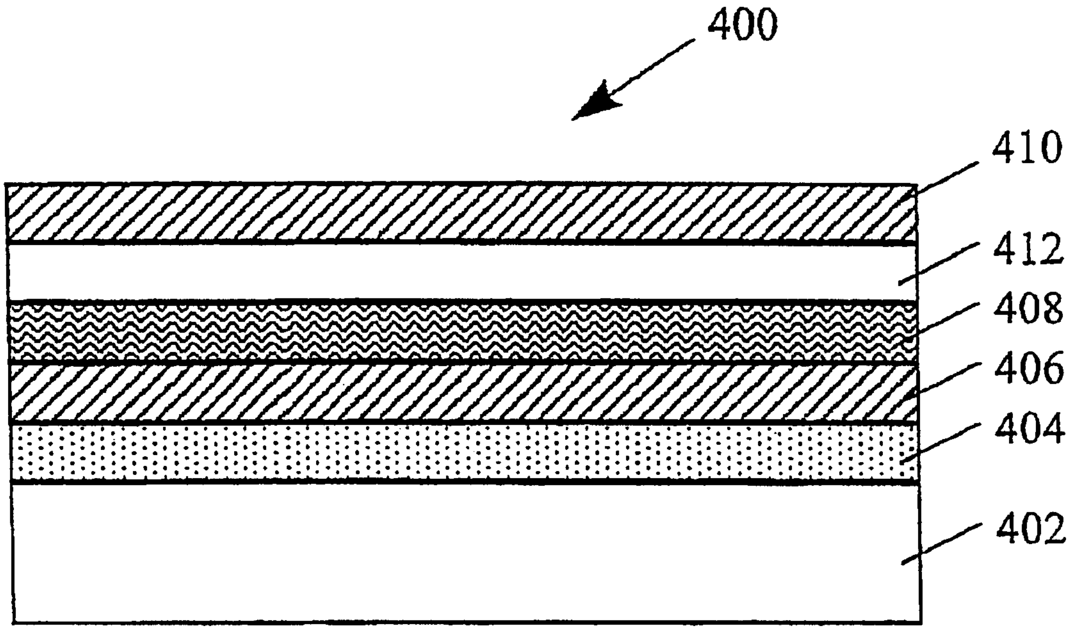
FIG. 10 is a sectional illustration of the component layers of a thermal stencil sheet, constructed and operative in accordance with a further preferred embodiment of the present invention.
Figure 11:
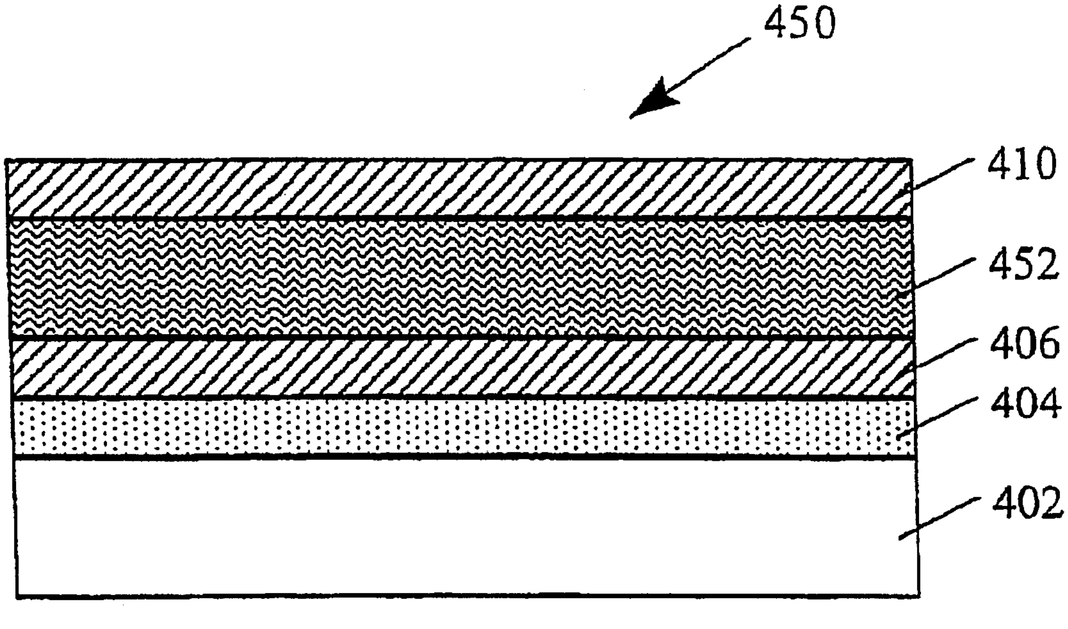
FIG. 11 is a sectional illustration of the component layers of a thermal stencil sheet, constructed and operative in accordance with a further preferred embodiment of the present invention.

Reference is now made to FIGS. 10 and 11 which illustrate the component layers of a thermal master stencil sheet, generally designated 400 and 450, respectively constructed and operative in accordance with other preferred embodiments of the present invention. Stencil sheets 400 and 450 are similar and consist of a polyester sandwich having a radiation absorbing filler.

Referring to FIG. 10, stencil sheet 400 comprises a base layer 402, an adhesive layer 404, a first polyester layer 406, a second adhesive layer 408, a second polyester layer 410. A radiation absorbing surface, referenced 412, is applied between the first and second polyester layers 406 and 410, respectively.

FIG. 11 is similar to the embodiment of FIG. 10, except that the second adhesive layer 408 and radiation absorbing surface 412 are replaced with a paste layer 452 which contains a mixture of adhesive and radiation absorbing material.

The base of each of the various examples of thermal stencil sheets, described hereinabove with respect to FIGS. 5 and 8–11 is similar and generally consists of a porous layer consisting of fibrous material such as non-woven tissue. As described hereinabove with reference to FIG. 6, the type of perforation formed in the stencil sheet occurs due to the absorption of the IR laser rays by the absorbing layer and the heating of the thermal film at the point of absorption.

Figure 12:
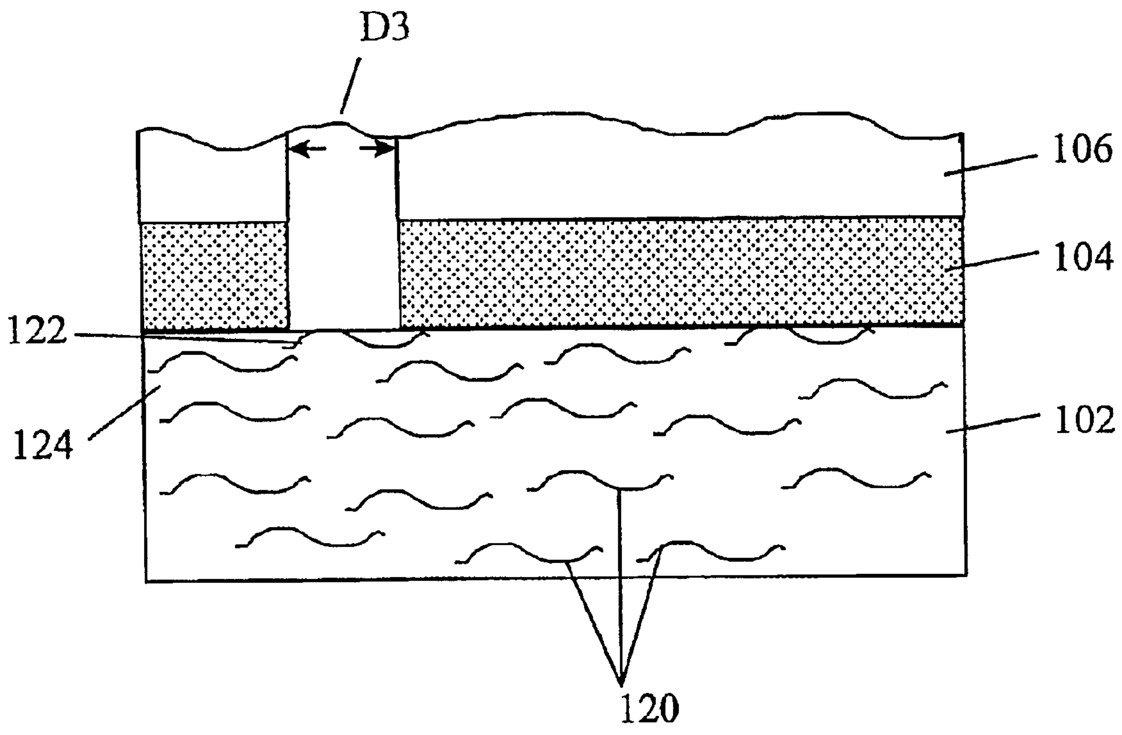
FIG. 12 is an enlarged sectional view of the porous base material of a stencil sheet.

Being a thermal process, it is very sensitive to heat diffusion effects. Reference is now made to FIG. 12, which is an enlarged sectional view of the porous base material, referenced 102, of FIG. 5. Base 102 consists of non-homogenous fibrous material 120 having only a few randomly scattered fibers 122 in contact with the thermal film layer 106. Most of the volume of the base comprises air 124 surrounding the fibers 122. Thus, the level of heating within the laser spot area is not constant and therefore, the diameter ($d_3$) of the perforation bore (see FIG. 6) may vary.

Figure 13:
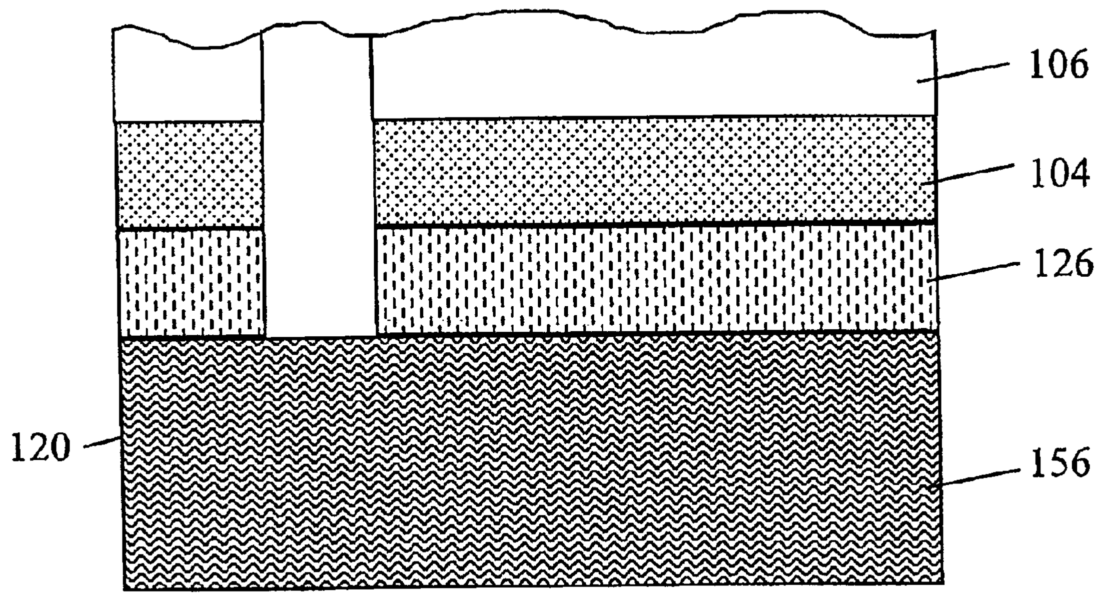
FIG. 13 is an enlarged sectional view of the porous base of a stencil sheet of FIG. 5, constructed and operative in accordance with a preferred embodiment of the present invention.

The Applicants have realized that by improving the base structure, the definition and resolution of the film stencil can be improved. Reference is now made to FIG. 13 which is an enlarged sectional view of the porous base, generally designated 156, constructed and operative in accordance with a preferred embodiment of the present invention. Base 156 comprises fibrous material 122 (similar to FIG. 12) saturated with liquid 126. Consequently, the thermal features of the liquid 126 are closer to the thermal features of the fibers 122 than the air 124 (FIG. 12).

Liquid 126 may comprise any suitable liquid including water, petroleum solvent, Toluene and printing ink, for example.

The liquid 126 may be applied to the base 102 in a number of methods, for example, by spraying or roller application. The liquid application takes place before the imaging stage.

Figure 14:
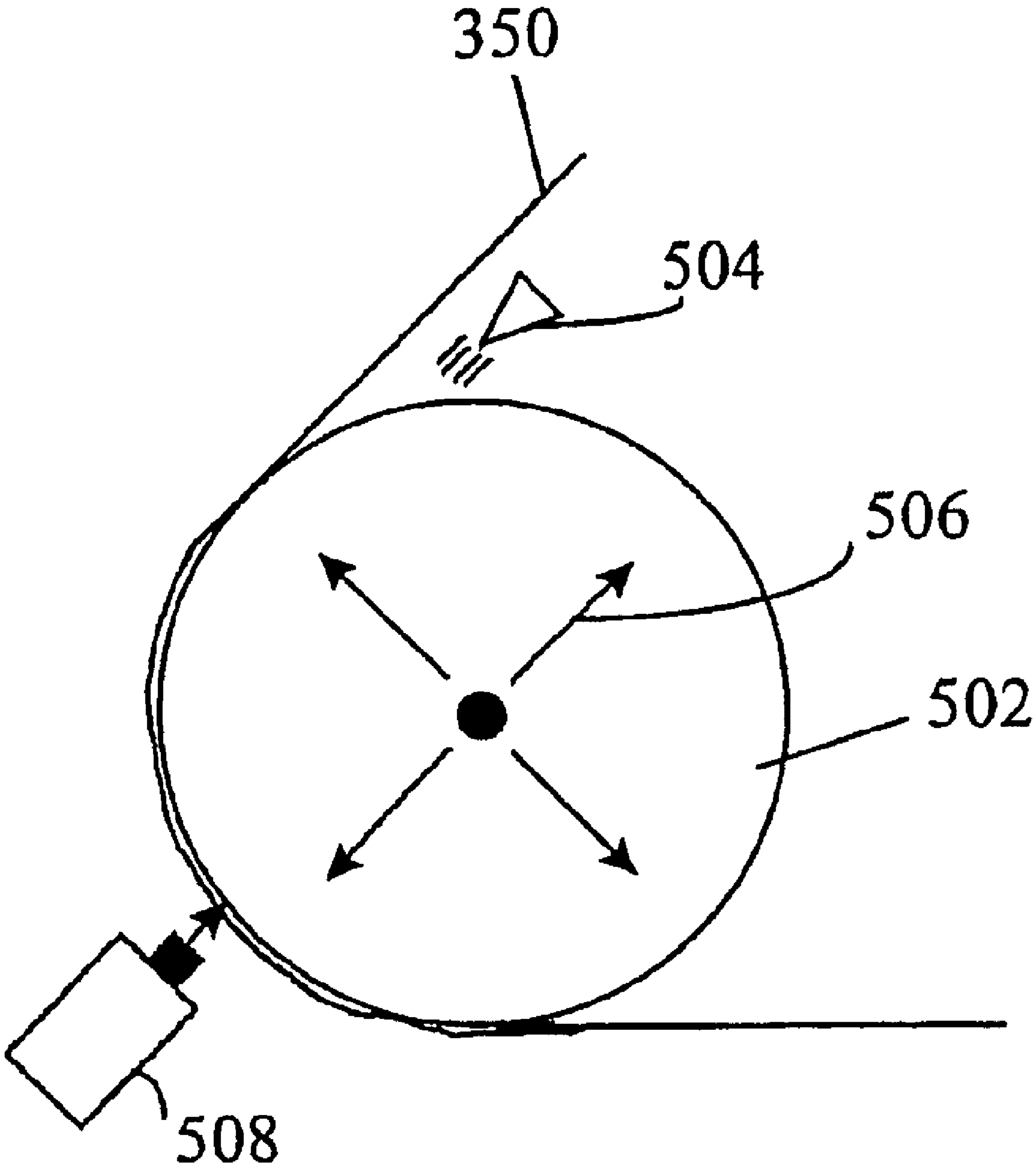
FIG. 14 is a schematic illustration of a stencil printing cylinder used with the stencil sheet of FIG. 5.

Reference is now made to FIG. 14 which is a schematic illustration of a stencil printing cylinder, 502, such as used in a duplicating machine. In a preferred embodiment, the stencil 350 (FIG. 13), is imaged while it is wrapped around the stencil printing cylinder 502, As the blank stencil 350 is wrapped around the stencil cylinder 502, an array of nozzles 504 sprays the liquid 126 into the contact area between the stencil 350 and the surface of the cylinder 502. The liquid may be ink, similar to the ink stored in the ink vehicle 506, or any other suitable liquid which does not conflict with the ink. The stencil tissue 156 thus becomes absorbed with the liquid 126 just prior to the exposure by the imaging head 508 After imaging, the liquid 126 is pushed out of the stencil by the ink during printing. Optionally, the stencil is dried prior to the application of ink.

In another embodiment, the stencil cylinder 502 described above is replaced by a plain cylinder on which the stencil is imaged prior to wrapping it around the stencil printing cylinder.

It will be further appreciated that the present invention is not limited by what has been described hereinabove and that numerous modifications, all of which fall within the scope of the present invention, exist. Rather the scope of the invention is defined by the claims which follow:

What is claimed is:

1. A thermal stencil sheet comprising:

a radiation absorbing layer attached by means of an adhesive to a base layer, said radiation absorbing layer containing a resin based film having infrared (IR) absorbing material dispersed therein; and a thermal film overlaying said radiation absorbing layer.

2. A thermal stencil sheet according to claim 1, wherein said radiation absorbing layer comprises any of the following group: carbon black, iron oxide and infra red absorbing dyes.

3. A thermal stencil sheet according to claim 1, wherein said resin based film contains any of the following group: polyethylene terephthalate (PET), polyurethanes, nitro cellulose and cellulose acetate butyrate.

4. A thermal stencil sheet according to claim 1 and wherein said adhesive is a ketone soluble glue.

5. A thermal stencil sheet according to claim 1, wherein said base comprises porous fibrous material which is saturatable with liquid.

6. A thermal stencil sheet comprising:

a radiation absorbing layer containing a resin based film having infrared (IR) absorbing material dispersed therein and further comprising an adhesive mixed therein for adhering said radiation absorbing layer to a base layer; and a thermal film overlaying said radiation absorbing layer.

7. A thermal stencil sheet comprising:

a radiation absorbing layer containing a resin based film having infra red (IR) absorbing material dispersed therein;

a topmost polyester layer overlaying said radiation absorbing layer; and an intermediate polyester layer underlying said radiation absorbing layer, wherein said intermediate layer is attached by means of an adhesive to a base layer.

8. A thermal stencil sheet according to claim 7 and wherein said radiation absorbing layer is attached by means of an adhesive to said intermediate layer.

9. A thermal stencil sheet according to claim 7 and wherein said radiation absorbing layer further comprises an adhesive mixed therein for adhering said radiation absorbing layer to said intermediate layer.

10. A stencil printing system comprising:

laser source means for supplying an infra red (IR) laser beam;

control means for controlling said laser source means; and a stencil sheet comprising:

a radiation absorbing layer attached by means of an adhesive to a base layer, said radiation absorbing layer containing a resin based film having infrared (IR) absorbing material dispersed therein; and a thermal film overlaying said radiation absorbing layer.

11. A stencil printing system according to claim 10, wherein said radiation absorbing layer comprises any of the following group: carbon black, iron oxide and infra red absorbing dyes.

12. A stencil printing system according to claim 10, wherein said resin based film contains any of the following group: polyethylene terephthalate (PET), polyurethanes, nitro cellulose and cellulose acetate butyrate.

13. A stencil printing system according to claim 10 and wherein said adhesive is a ketone soluble glue.

14. A stencil printing system according to claim 10 and further comprising a liquid applicator for applying liquid to said stencil sheet.

15. A stencil printing system according to claim 14 and wherein said liquid comprises any of a group including water, petroleum solvent, Toluene and printing ink.

16. A stencil printing system comprising:

laser source means for supplying an infra red (IR) laser beam;

control means for controlling said laser source means; and a stencil sheet comprising:

a radiation absorbing layer containing a resin based film having infrared (IR) absorbing material dispersed therein and further comprising an adhesive mixed therein for adhering said radiation absorbing layer to a base layer; and a thermal film overlaying said radiation absorbing layer.

17. A stencil printing system comprising:

laser source means for supplying an infra red (IR) laser beam;

control means for controlling said laser source means; and a stencil sheet comprising:

a radiation absorbing layer containing a resin based film having infra red (IR) absorbing material dispersed therein;

a topmost polyester layer overlaying said radiation absorbing layer; and an intermediate polyester layer underlying said radiation absorbing layer, wherein said intermediate layer is attached by means of an adhesive to a base layer.

18. A stencil printing system according to claim 17 and wherein said radiation absorbing layer is attached by means of an adhesive to said intermediate layer.

19. A stencil printing system according to claim 17 and wherein said radiation absorbing layer further comprises an adhesive mixed therein for adhering said radiation absorbing layer to said intermediate layer.

20. A stencil printing system comprising:

a laser able to produce an infra red (IR) laser beam; and a thermal stencil sheet able to be perforated by said IR laser beam prior to inking of said stencil sheet for printing, said sheet comprising a radiation absorbing layer having a resin based film and infra red (IR) absorbing material dispersed therein.

21. A stencil printing method comprising:

using a laser beam to perforate a thermal stencil sheet according to a predetermined pattern, said sheet comprising a radiation absorbing layer having a resin based film and infra red (IR) absorbing material dispersed therein; and delivering said perforated stencil to a drum having an inking roller for printing.

* * * * *